(12) United States Patent
Reji

(10) Patent No.: US 12,086,199 B2
(45) Date of Patent: Sep. 10, 2024

(54) SYSTEM AND METHOD FOR PROVIDING ELECTRONIC NAVIGATION ASSISTANCE BASED ON DATA PATTERNS VIA PROCESS TRACKING GRAPHING

(71) Applicant: BANK OF AMERICA CORPORATION, Charlotte, NC (US)

(72) Inventor: Joel Reji, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/987,976

(22) Filed: Nov. 16, 2022

(65) Prior Publication Data
US 2024/0160681 A1 May 16, 2024

(51) Int. Cl.
*G06F 16/954* (2019.01)
*G06F 16/951* (2019.01)

(52) U.S. Cl.
CPC .......... *G06F 16/954* (2019.01); *G06F 16/951* (2019.01)

(58) Field of Classification Search
CPC .............................. G06F 16/954; G06F 16/951
See application file for complete search history.

(56) References Cited

U.S. PATENT DOCUMENTS

| | | |
|---|---|---|
| 7,000,832 B2 | 2/2006 | Washington |
| 7,406,088 B2 | 7/2008 | Magd |
| 7,407,091 B2 | 8/2008 | Graef |
| 7,661,583 B2 | 2/2010 | Schlabach |
| 7,870,498 B2 | 1/2011 | Drummond |
| 8,042,045 B1 | 10/2011 | Sullivan |
| 8,042,733 B2 | 10/2011 | Smith |
| 8,046,300 B2 | 10/2011 | Drummond |
| 8,118,215 B2 | 2/2012 | Coventry |
| 8,186,576 B2 | 5/2012 | Drummond |
| 8,328,087 B2 | 12/2012 | Drummond |
| 8,348,151 B1 | 1/2013 | Block |
| 8,448,849 B1 | 5/2013 | Jenkins |
| 8,496,168 B1 | 7/2013 | Miller |
| 8,746,551 B2 | 6/2014 | Bryant |
| 8,941,709 B2 | 1/2015 | Johnson |
| 9,717,983 B1 * | 8/2017 | Pollowitz ............ G07F 17/3288 |
| 9,881,255 B1 * | 1/2018 | Castellanos ......... G06F 16/9574 |

(Continued)

*Primary Examiner* — Dhairya A Patel
(74) *Attorney, Agent, or Firm* — Moore & Van Allen PLLC; Nicholas C. Russell

(57) ABSTRACT

Systems, computer program products, and methods are described herein for providing electronic navigation assistance based on data patterns via process tracking graphing. The method includes receiving one or more network navigation inputs completed by a user device associated with a user. The one or more network navigation inputs are indications of navigation between two or more pages on a network. The method also includes comparing the one or more network navigation inputs with one or more previous network navigation indicators. The method further includes determining a user location status based on the comparison of the one or more network navigation inputs with the one or more previous network navigation indicators. The user location status indicates whether the user needs assistance. The method still further includes causing a transmission of an assistance notification to the user device associated with the user based on determining that the user needs assistance.

17 Claims, 6 Drawing Sheets

(56) References Cited

U.S. PATENT DOCUMENTS

| | | |
|---|---|---|
| 9,990,636 B1 | 6/2018 | Lewis |
| 10,121,139 B2 | 11/2018 | Pitroda |
| 10,395,199 B1 | 8/2019 | Gibson |
| 10,685,537 B1 | 6/2020 | Moore |
| 10,977,617 B2 | 4/2021 | Tseretopoulos |
| 2011/0202520 A1* | 8/2011 | Teran .................. G06F 16/9535 |
| | | 707/E17.108 |
| 2015/0254214 A1* | 9/2015 | Rosenberg ............... G09B 7/08 |
| | | 715/202 |
| 2016/0078141 A1* | 3/2016 | Fang ................... G06F 16/9535 |
| | | 707/709 |
| 2016/0314207 A1* | 10/2016 | Huang .................. G06F 16/951 |
| 2017/0344609 A1* | 11/2017 | Wadley ............. G06F 16/24578 |
| 2020/0014670 A1* | 1/2020 | Isaacson ............. G06Q 30/0625 |
| 2023/0156020 A1* | 5/2023 | McCarthy ........... H04L 63/1425 |
| | | 726/22 |
| 2023/0205825 A1* | 6/2023 | Phillips .............. G06Q 30/0641 |
| | | 707/706 |

* cited by examiner

SYSTEM AND METHOD FOR PROVIDING ELECTRONIC NAVIGATION ASSISTANCE BASED ON DATA PATTERNS VIA PROCESS TRACKING GRAPHING

TECHNOLOGICAL FIELD

Example embodiments of the present disclosure relate generally to providing electronic navigation assistance and, more particularly, to providing electronic navigation assistance based on data patterns via process tracking graphing.

BACKGROUND

Websites can often be difficult to navigate due to a large number of pages available to navigate for a user. As a result, users can often get lost looking for specific resources on a website. There currently exists little to no automated techniques to assist lost users. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for providing electronic navigation assistance based on data patterns via process tracking graphing. The system includes at least one non-transitory storage device and at least one processing device coupled to the at least one non-transitory storage device. The at least one processing device is configured to receive one or more network navigation inputs completed by a user device associated with a user. The one or more network navigation inputs are indications of navigation between two or more pages on a network. The at least one processing device is also configured to compare the one or more network navigation inputs with one or more previous network navigation indicators. The one or more previous network navigation indicators include one or more network navigation inputs from at least one previous navigation of the two or more pages on the network and a destination page for each of the at least one previous navigation. The at least one processing device is further configured to determine a user location status based on the comparison of the one or more network navigation inputs with the one or more previous network navigation indicators. The user location status indicates whether the user needs assistance. The at least one processing device is still further configured to cause a transmission of an assistance notification to the user device associated with the user based on determining that the user needs assistance.

In some embodiments, the assistance notification includes at least one recommended destination for the user device associated with the user based on the one or more network navigation inputs. In some embodiments, the assistance notification includes a destination request from the user device associated with the user. In such an embodiment, the at least one processing device is also configured to provide access to a destination indicated in the destination request response upon receiving a destination request response to the destination request from the user device associated with the user.

In some embodiments, the comparison of the one or more network navigation inputs with the one or more previous network navigation indicators is completed by a machine learning model, and the one or more network navigation inputs from the at least one previous navigation of the two or more pages on the network and the destination page for each of the at least one previous navigation are used to train the machine learning model. In some embodiments, the machine learning model is a logistic regression model configured to categorize the one or more network navigation inputs into a first group or a second group with the first group indicating that the user needs assistance.

In some embodiments, the one or more previous network navigation indicators are generated via a network page graph of at least two page nodes and at least one navigation edges, the at least two page nodes include a page node corresponding to each of the two or more pages of the network, and each of the at least one navigation edges correspond to a link between the two or more pages. In some embodiments, the at least one processing device is also configured to train a machine learning model based on the network page graph.

In another example embodiment, a computer program product for providing electronic navigation assistance based on data patterns via process tracking graphing is provided. The computer program product includes at least one non-transitory computer-readable medium having computer-readable program code portions embodied therein. The computer-readable program code portions include an executable portion configured to receive one or more network navigation inputs completed by a user device associated with a user. The one or more network navigation inputs are indications of navigation between two or more pages on a network. the computer-readable program code portions also include an executable portion configured to compare the one or more network navigation inputs with one or more previous network navigation indicators. The one or more previous network navigation indicators include one or more network navigation inputs from at least one previous navigation of the two or more pages on the network and a destination page for each of the at least one previous navigation. The computer-readable program code portions further include an executable portion configured to determine a user location status based on the comparison of the one or more network navigation inputs with the one or more previous network navigation indicators. The user location status indicates whether the user needs assistance. The computer-readable program code portions still further include an executable portion configured to cause a transmission of an assistance notification to the user device associated with the user based on determining that the user needs assistance.

In some embodiments, the assistance notification includes at least one recommended destination for the user device associated with the user based on the one or more network navigation inputs. In some embodiments, the assistance notification includes a destination request from the user device associated with the user and the computer program product further includes an executable portion configured to provide access to a destination indicated in a destination request response upon receiving the destination request response to the destination request from the user device associated with the user.

In some embodiments, the comparison of the one or more network navigation inputs with the one or more previous network navigation indicators is completed by a machine learning model. The one or more network navigation inputs from the at least one previous navigation of the two or more pages on the network and the destination page for each of the at least one previous navigation are used to train the machine learning model. The machine learning model is a logistic regression model configured to categorize the one or more network navigation inputs into a first group or a second group with the first group indicating that the user needs assistance.

In some embodiments, the one or more previous network navigation indicators are generated via a network page graph of at least two page nodes and at least one navigation edges, the at least two page nodes include a page node corresponding to each of the two or more pages of the network, and each of the at least one navigation edges correspond to a link between the two or more pages. In some embodiments, the computer program product further includes an executable portion configured to train a machine learning model based on the network page graph.

In still another example embodiment, a computer-implemented method for providing electronic navigation assistance based on data patterns via process tracking graphing is provided. The method includes receiving one or more network navigation inputs completed by a user device associated with a user. The one or more network navigation inputs are indications of navigation between two or more pages on a network. The method also includes comparing the one or more network navigation inputs with one or more previous network navigation indicators. The one or more previous network navigation indicators include one or more network navigation inputs from at least one previous navigation of the two or more pages on the network and a destination page for each of the at least one previous navigation. The method further includes determining a user location status based on the comparison of the one or more network navigation inputs with the one or more previous network navigation indicators. The user location status indicates whether the user needs assistance. The method still further includes causing a transmission of an assistance notification to the user device associated with the user based on determining that the user needs assistance.

In some embodiments, the assistance notification includes at least one recommended destination for the user device associated with the user based on the one or more network navigation inputs. In some embodiments, the assistance notification includes a destination request from the user device associated with the user. In such an embodiment, the method also includes providing access to a destination indicated in the destination request response upon receiving a destination request response to the destination request from the user device associated with the user.

In some embodiments, the comparison of the one or more network navigation inputs with the one or more previous network navigation indicators is completed by a machine learning model, and the one or more network navigation inputs from the at least one previous navigation of the two or more pages on the network and the destination page for each of the at least one previous navigation are used to train the machine learning model.

In some embodiments, the machine learning model is a logistic regression model configured to categorize the one or more network navigation inputs into a first group or a second group with the first group indicating that the user needs assistance.

In some embodiments, the one or more previous network navigation indicators are generated via a network page graph of at least two page nodes and at least one navigation edges, the at least two page nodes include a page node corresponding to each of the two or more pages of the network, and each of the at least one navigation edges correspond to a link between the two or more pages.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the FIGURES may or may not be present in certain embodiments described herein. Some embodiments may include fewer (or more) components than those shown in the FIGURES.

DETAILED DESCRIPTION

Figure 1A:
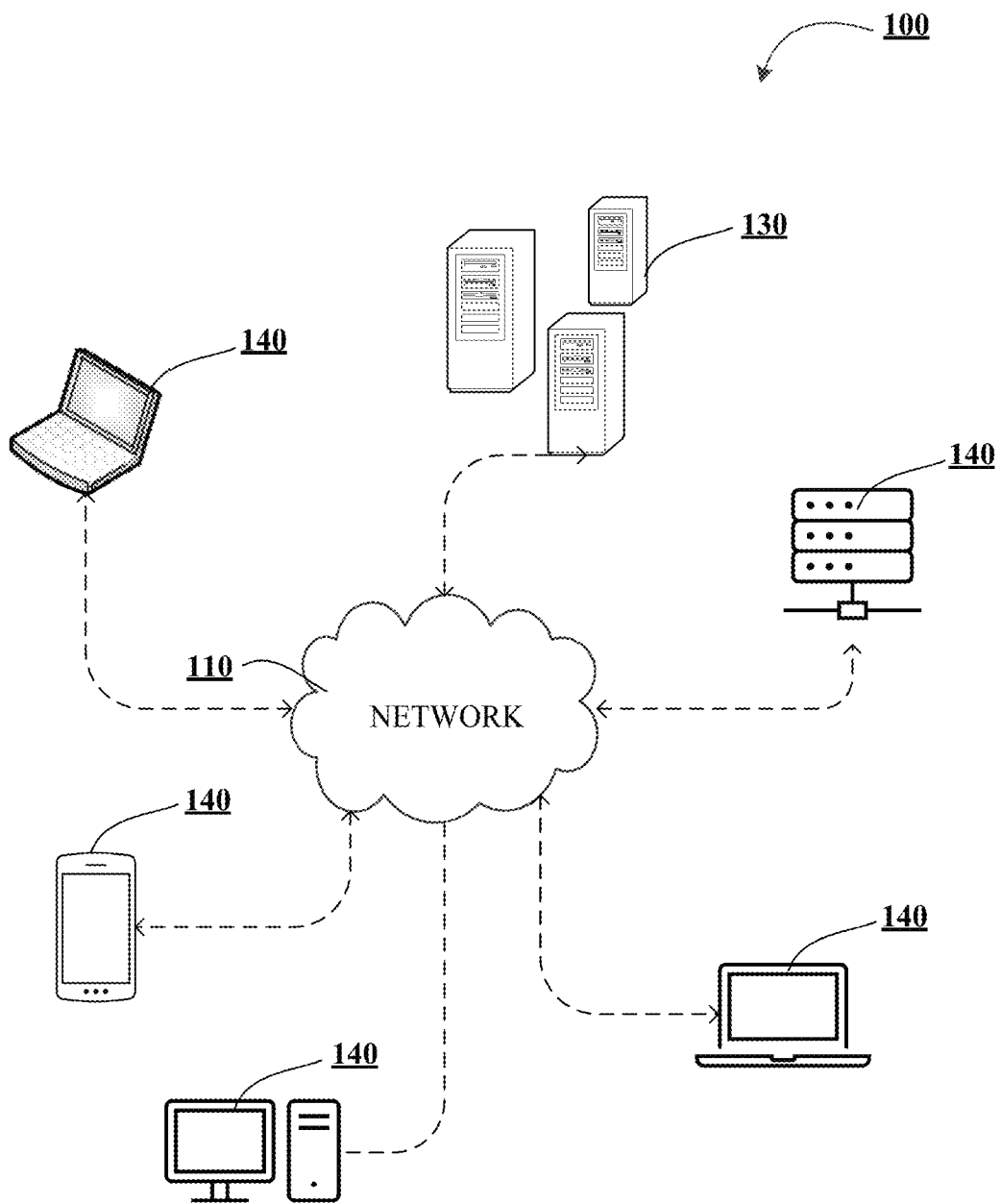
FIGS. 1A-1C illustrates technical components of an example distributed computing environment for providing electronic navigation assistance based on data patterns via process tracking graphing, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Complex network structure can be confusing and/or difficult for users to understand. As a result, mobile applications and/or websites can be confusing or difficult to understand. Currently, there is no functional way to assist a user that is lost without the user specifically asking for assistance. However, users may be reluctant to request assistance, as the user may not realize that the user is lost and/or may not know how to ask for the help in reaching the intended destination (e.g., the user may not know the name of the intended destination).

Various embodiments of the present disclosure provide electronic navigation assistance based on data patterns via process tracking graphing. The system creates a network page graph that includes each of the pages of the network represented as page nodes and links between the pages represented as edges connecting said page nodes. The network page graph is used to train a machine learning model using previous network navigation indicators from previous navigations on the network. The previous navigations may be labeled as a successful navigation (e.g., the network received a resource request) or unsuccessful navigation (e.g., the network did not receive a resource request). The previous network navigation indicators are used to train the machine learning model (e.g., a logistic regression model). Upon training the machine learning model, the system can determine an instance in which a user is lost and/or needs assistance by comparing the one or more network navigation inputs of a user device associated with the user with the one or more previous network navigation indicators via the machine learning model. Based on determining that a user is lost, the system can provide an assistance notification to the user device associated with the user. The assistance notification can offer to provide assistance to the user, such as asking the user to provide the user's intended destination and/or recommending destinations based on the user's activity.

The present disclosure provides a solution to issues with network navigation and traffic issues. Namely, the automated navigation assistance allows for a reduction in network strain due to lost users scrolling through unnecessary pages on a network.

Figure 1B:
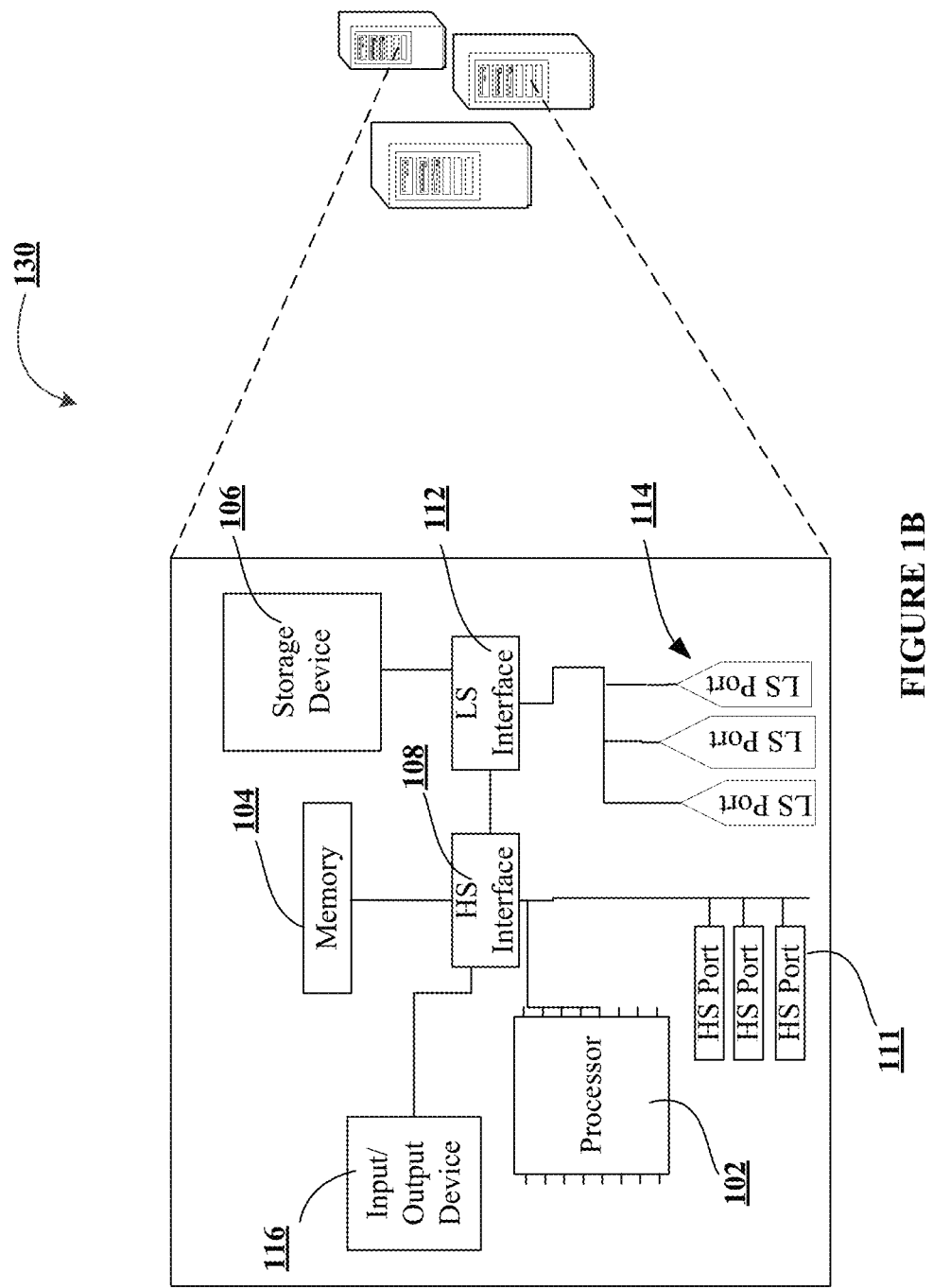
Figure 1C:
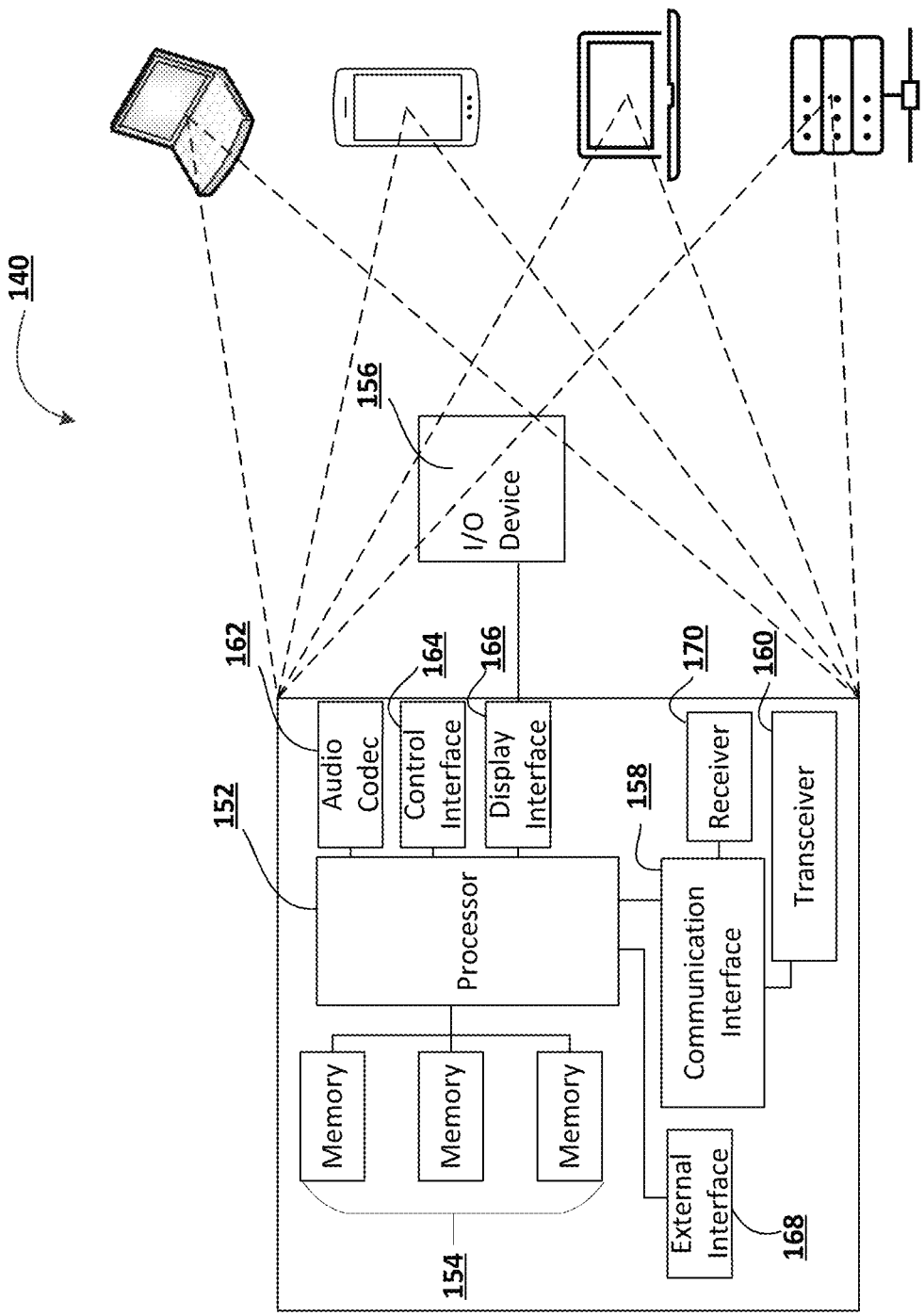

FIGS. 1A-1C illustrate technical components of an example distributed computing environment for providing electronic navigation assistance based on data patterns via process tracking graphing, in accordance with an embodiment of the disclosure. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be example only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an example component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is example only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an example component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
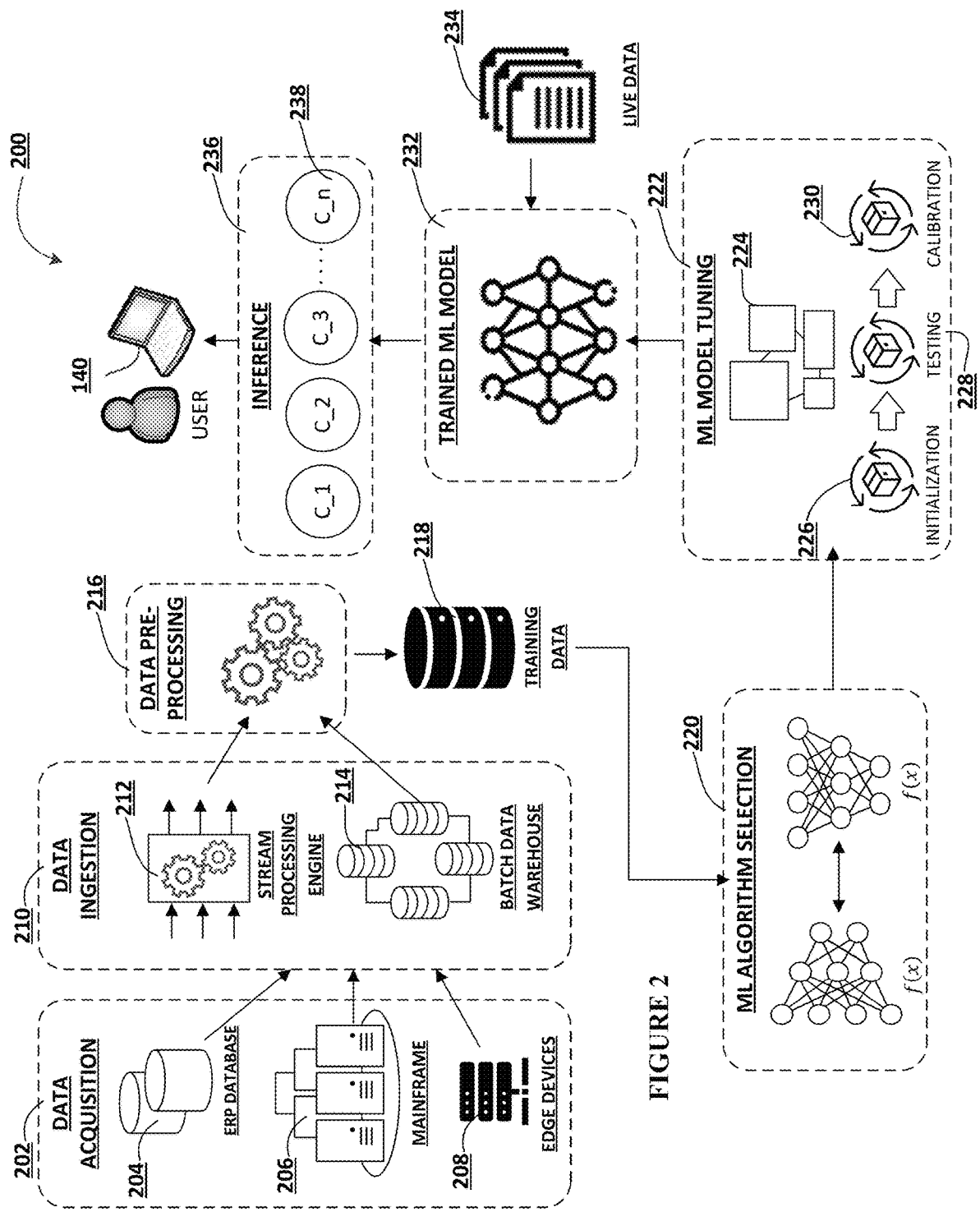
FIG. 2 illustrates an example machine learning (ML) subsystem architecture, in accordance with various embodiments of the present disclosure.

FIG. 2 illustrates an example machine learning (ML) subsystem architecture 200, in accordance with an embodiment of the present disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3:
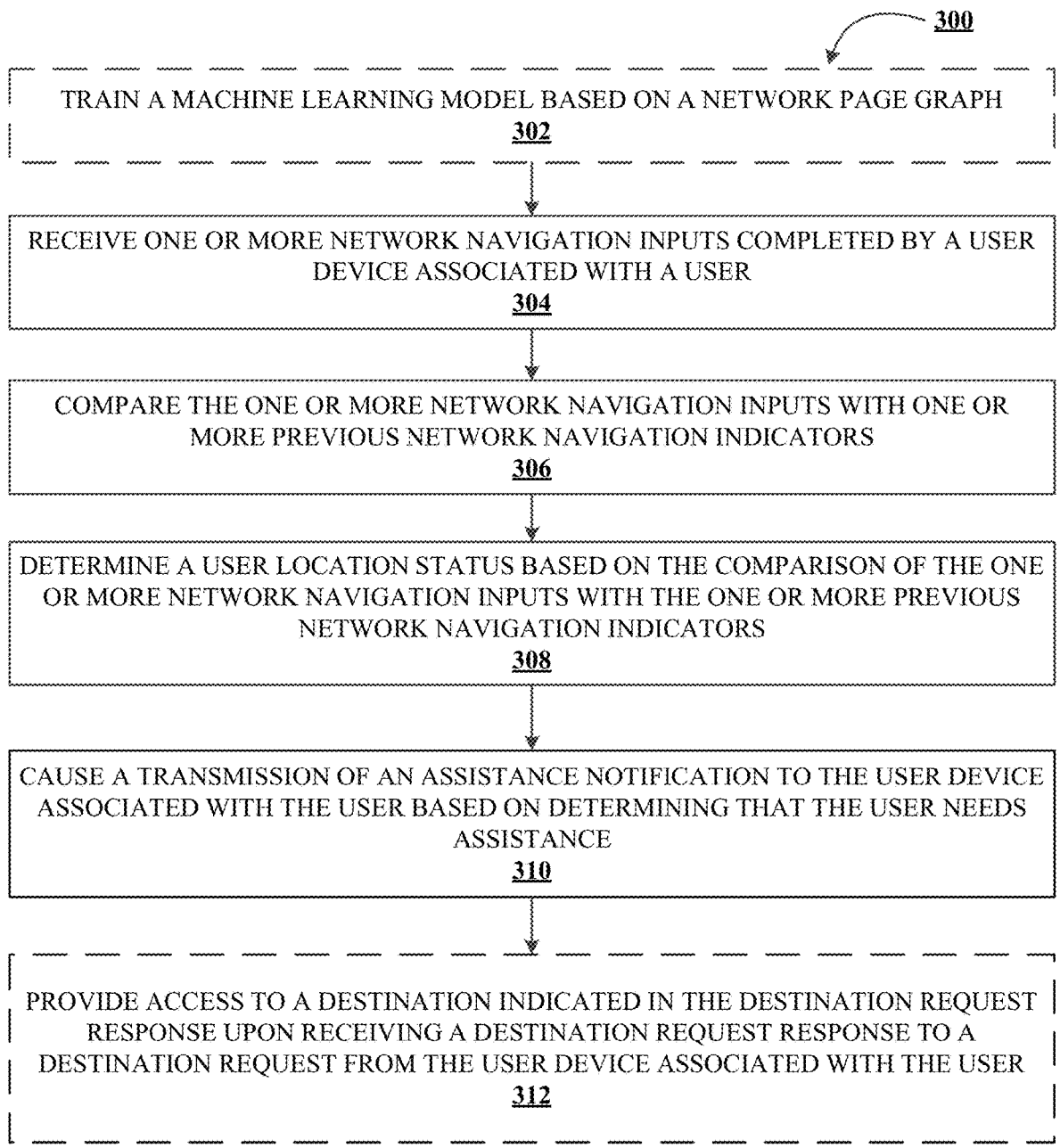
FIG. 3 illustrates a process flow for providing electronic navigation assistance based on data patterns via process tracking graphing, in accordance with various embodiments of the present disclosure.

FIG. 3 is a flow chart 300 that illustrates another example method of providing electronic navigation assistance based on data patterns via process tracking graphing. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Figure 4:
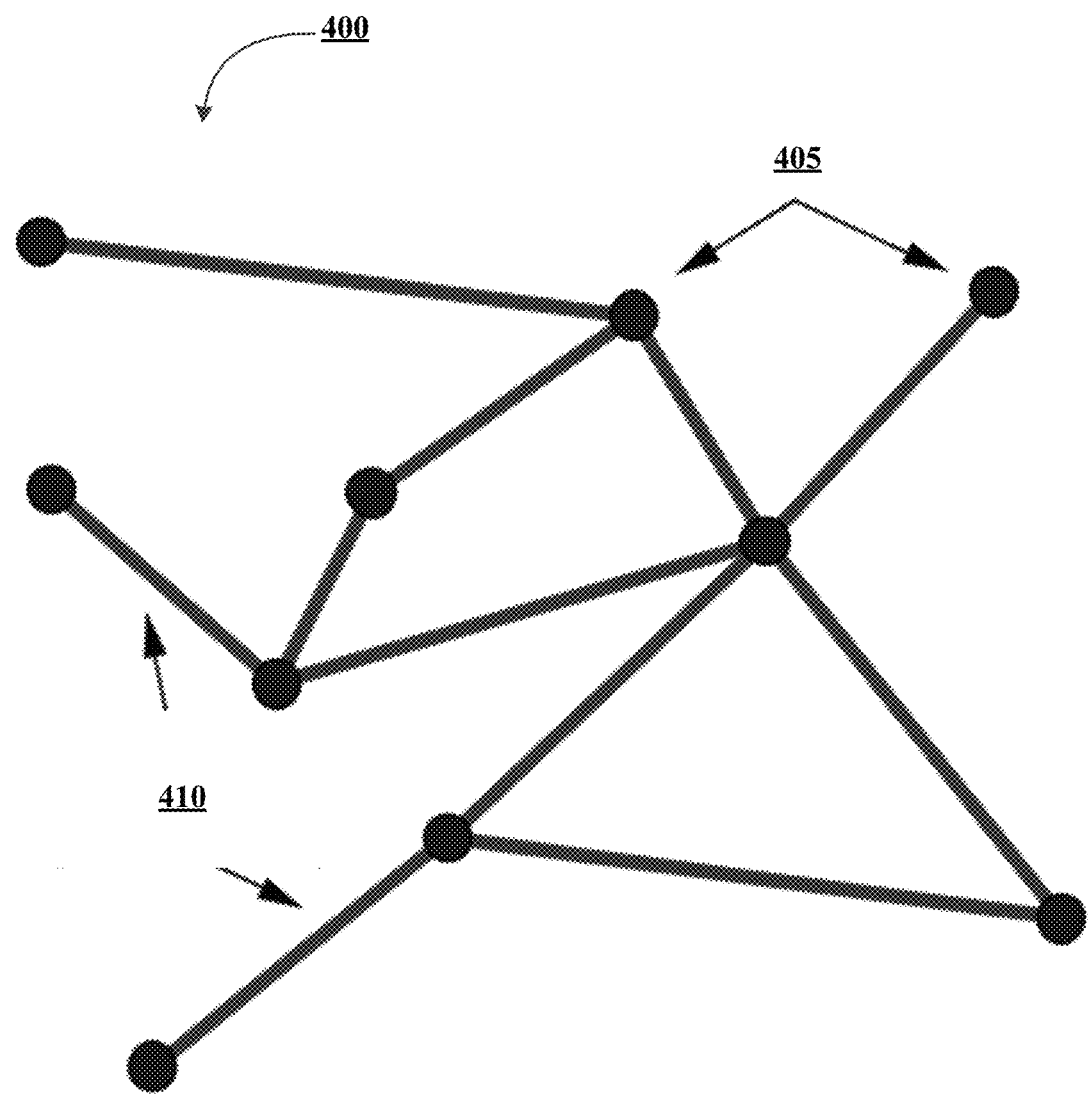
FIG. 4 illustrates an example network page graph, in accordance with various embodiments of the present disclosure.

Referring now to optional Block 302 of FIG. 3, the method includes training a machine learning model based on a network page graph. An example network page graph 400 is shown in FIG. 4. The network page graph includes page nodes (e.g., example page nodes 405) corresponding to each of the pages on the network. The page nodes are connected via navigation edges (e.g., example navigation edges 410) that correspond to links between the given pages. For example, a hyperlink on a first page that takes a user to a second page would be illustrates by a navigation edge connecting the first page and the second page. The navigation edge may be directional (e.g., the edge may indicate the directional flow of the network).

The network page graph is used to teach a machine learning model using previous network navigation indicators from previous navigations on the network. The previous navigations may be any previous navigation of the network by one or more users (e.g., need not necessarily be the same user in which is being analyzed in reference to the present method). The previous navigations may be labeled as a successful navigation (e.g., the network receives a resource request) or unsuccessful navigation (e.g., the network does not receive a resource request).

The machine learning model may be logistic regression model that is trained using the network page graph and the previous network navigation indicators from previous navigations. The machine learning model may be configured to classify navigation information from a user (e.g., one or more network navigation inputs discussed in reference to Block 304 below) into a first group or a second group. The first group indicates that an instance in which a user is likely lost (e.g., the one or more network navigation inputs are more similar to unsuccessful previous navigations) and needs assistance. The machine learning model may be retrained periodically based on changes to the network (e.g., changes to the page nodes and/or navigation edges of the network page graph).

In some embodiments, the machine learning model may be built using one or more graph metrics calculated for different paths along the network page graph. Example metrics that may be used may include average out-degree of nodes in the path (e.g., based on the number of hyperlinks on a page), average number of times a link is traversed (e.g., traversing the same link more than a typical user may indicate that a user is lost), amount of detour for the navigation (e.g., ratio of the current path length to the shortest path from the start node to the current node), relative mean distance from root (e.g., average distance from the root node to every other node in the path), connection ratios (e.g., ratio of all the edges used in the path to the total number of edges connecting the nodes in the path), shortest path from root to target, amount of backtracking (e.g., returning to previously traversed node), distance from current node to expected target, and/or clickstream compactness (e.g., how much of the graph is traversed). The machine learning model may be configured to analyze a user path from the one or more one or more network navigation inputs received in Block 304 using one or more of the above metrics. The metrics can also be used to compare the current user path to previous navigations (e.g., a current navigation that has similar metrics to an unsuccessful previous navigation may indicate that the user is lost and/or needs assistance).

Referring now to Block 304 of FIG. 3, the method includes receiving one or more network navigation inputs completed by a user device (e.g., end-point device 140) associated with a user. The one or more network navigation inputs are indications of navigation between two or more pages on a network. The network may be a mobile application and/or website. As a user moves between pages (e.g., by clicking on hyperlinks on a given page), the network navigation input(s) are tracked and provided to the system for analyzing to determine whether the user is lost. The one or more network navigation inputs completed by the user device associated with a user may be received in real-time or near real-time (e.g., the network navigation input(s) may be received shortly after a user navigates to a new page).

Referring now to Block 306 of FIG. 3, the method includes comparing the one or more network navigation inputs with one or more previous network navigation indicators. The one or more previous network navigation indicators include one or more network navigation inputs from at least one previous navigation of the two or more pages on the network and a destination page for each of the at least one previous navigation.

The comparison of the one or more network navigation inputs with the one or more previous network navigation indicators may be completed using a machine learning model (e.g., the machine learning model trained in optional Block 302). The machine learning model may be a logistic regression model configured to categorize the one or more network navigation inputs into a first group or a second group. In such an instance, the first group may indicate that the user needs assistance.

The comparison of the one or more network navigation inputs with the one or more previous network navigation indicators may be completed using the one or more graph metrics discussed above in reference to the machine learning model. For example, the one or more network navigation inputs can be compared to previous navigations to determine whether the one or more network navigation inputs are more similar to a previous successful navigation (e.g., the user does not need assistance) or a previous unsuccessful navigation (e.g., the user may need assistance).

Referring now to Block 308 of FIG. 3, the method includes determining a user location status based on the comparison of the one or more network navigation inputs with the one or more previous network navigation indicators. The user location status indicates whether the user needs assistance. In an instance, the user location status indicates that the user does not need assistance, the system may not provide any notification or communication with the user (e.g., the user continues traversing the network without interruption). In an instance in which the user location status indicates that the user may need assistance, the method includes the features of Block 310 discussed below.

Referring now to Block 310 of FIG. 3, the method includes causing a transmission of an assistance notification to the user device associated with the user based on determining that the user needs assistance. The assistance notification to the user device associated with the user may be provided on a user interface of the user device. The assistance notification may be provided as a pop-up notification (e.g., covering at least a portion of the user interface of the user device). The assistance notification may be displayed in the form of a chat with the user (e.g., a chat bubble may be provided to the user asking if the user needs assistance).

The assistance notification may include at least one recommended destination for the user device associated with the user based on the one or more network navigation inputs. The machine learning model may be trained based on the previous navigations to determine an intended destination based on the present traversal. For example, users that traverse two specific nodes may often result in traversal to a third node more often than other nodes and therefore, the third node would be recommended to the user. The recommended destination may also be nodes adjacent to the user path (e.g., the recommended destination may be a node that is connected to the current node that the user has not yet traversed).

In some embodiments, the assistance notification includes a destination request from the user device associated with the user. The destination request may include the recommended destination(s) discussed above or be open ended (e.g., the assistance notification may be a prompt to the user to provide the user's intended destination). In response to the destination request, the system may receive a destination request response that may indicate the intended destination (e.g., selection of one of the recommended destination(s) or a response to the open-ended prompt). The destination request response may be a selection or input by the user on the user interface of the user device associated with the user.

In an instance in which the destination request response is a response to the open-ended prompt, the destination request response may include the specific intended destination (e.g., the user may respond "Bill Pay") and/or the destination request response may include information for the system to use to determine the intended destination (e.g., the user may say "I have an invoice" and the system may determine that the intended destination is the page in which an invoice can be paid). Various methods can be used to determine the intended destination based on the open-ended destination request response.

Referring now to optional Block 312 of FIG. 3, the method includes providing access to a destination indicated in the destination request response upon receiving a destination request response to a destination request from the user device associated with the user. In response to receiving the destination request response, the system may automatically route the user device to the intended destination. In some embodiments, the system may cause a transmission of a confirmation prompt to the user device associated with the user (e.g., asking the user to confirm the intended destination and/or asking the user if the user would like to be automatically routed to the intended destination).

In some embodiments, the system may cause a transmission of navigation assistance information to the user device associated with the user on how to traverse to the intended destination on future visits. For example, the user may receive information that illustrates the steps to traverse from a login page of a website/mobile application to the intended destination.

In an instance in which an intended destination is not determined based on the destination request response, the system may cause transmission of an escalating action which allows for manual assistance of the user. As such, a user can be routed to a support person to assist the user.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain example embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing electronic navigation assistance based on data patterns via process tracking graphing, the system comprising:
   at least one non-transitory storage device; and
   at least one processing device coupled to the at least one non-transitory storage device, wherein the at least one processing device is configured to:
   receive one or more network navigation inputs completed by a user device associated with a user, wherein the one or more network navigation inputs are indications of executed navigation between two or more pages on a network;
   compare, using a machine learning model, the one or more network navigation inputs with one or more previous network navigation indicators, wherein the machine learning model is trained using the one or more previous network navigation indicators that include one or more network navigation inputs from at least one previous navigation of the two or more pages on the network and a destination page for each of the at least one previous navigation, wherein the one or more network navigation inputs from at least one previous navigation of the two or more pages on the network comprises at least one of an average number of times a link is traversed during the at least one previous navigation, amount of detour associated with the at least one previous navigation, amount of backtracking associated with at least one previous navigation, and clickstream compactness indicating traversal distance associated with the at least one previous navigation;
   based on the comparison of the one or more network navigation inputs with the one or more previous network navigation indicators, determine a user location status, wherein the user location status indicates a node of a plurality of nodes on the network, wherein the user location status indicates whether the user needs assistance;
   based on determining that the user needs assistance, cause a transmission of an assistance notification to the user device associated with the user and;
   wherein the one or more network navigation inputs from at least one previous navigation of the two or more pages on the network further comprises an average out degree of nodes in a path associated with the at least one previous navigation, an average distance from a root node to every other node associated with the at least one previous navigation, connection ratios associated with the at least one previous navigation, and shortest path from the root node to a target node associated with the at least one previous navigation.

2. The system of claim 1, wherein the assistance notification comprises at least one recommended destination for the user device associated with the user based on the one or more network navigation inputs.

3. The system of claim 1, wherein the assistance notification comprises a destination request from the user device associated with the user and upon receiving a destination request response to the destination request from the user device associated with the user, the at least one processing device is configured to provide access to a destination indicated in the destination request response.

4. The system of claim 1, wherein the machine learning model is a logistic regression model configured to categorize the one or more network navigation inputs into a first group or a second group, wherein the first group indicates that the user needs assistance.

5. The system of claim 1, wherein the one or more previous network navigation indicators are generated via a network page graph of at least two page nodes and at least one navigation edges, wherein the at least two page nodes comprise a page node corresponding to each of the two or more pages of the network, and wherein each of the at least one navigation edges correspond to a link between the two or more pages.

6. The system of claim 5, wherein the at least one processing device is configured to train a machine learning model based on the network page graph.

7. A computer program product for providing electronic navigation assistance based on data patterns via process tracking graphing, the computer program product comprising at least one non-transitory computer-readable medium having computer-readable program code portions embodied therein, the computer-readable program code portions comprising:
   an executable portion configured to receive one or more network navigation inputs completed by a user device associated with a user, wherein the one or more network navigation inputs are indications of executed navigation between two or more pages on a network;
   an executable portion configured to compare, using a machine learning model, the one or more network navigation inputs with one or more previous network navigation indicators, wherein the machine learning model is trained using the one or more previous network navigation indicators that include one or more network navigation inputs from at least one previous navigation of the two or more pages on the network and a destination page for each of the at least one previous navigation, wherein the one or more network navigation inputs from at least one previous navigation of the two or more pages on the network comprises at least one of an average number of times a link is traversed during the at least one previous navigation, amount of detour associated with the at least one previous navigation, amount of backtracking associated with at least one previous navigation, and clickstream compactness indicating traversal distance associated with the at least one previous navigation;

an executable portion configured to determine a user location status based on the comparison of the one or more network navigation inputs with the one or more previous network navigation indicators, wherein the user location status indicates a node of a plurality of nodes on the network, wherein the user location status indicates whether the user needs assistance;

an executable portion configured to cause a transmission of an assistance notification to the user device associated with the user based on determining that the user needs assistance and;

wherein the one or more network navigation inputs from at least one previous navigation of the two or more pages on the network further comprises an average out degree of nodes in a path associated with the at least one previous navigation, an average distance from a root node to every other node associated with the at least one previous navigation, connection ratios associated with the at least one previous navigation, and shortest path from the root node to a target node associated with the at least one previous navigation.

8. The computer program product of claim 7, wherein the assistance notification comprises at least one recommended destination for the user device associated with the user based on the one or more network navigation inputs.

9. The computer program product of claim 7, wherein the assistance notification comprises a destination request from the user device associated with the user and the computer program product further comprises an executable portion configured to provide access to a destination indicated in a destination request response upon receiving the destination request response to the destination request from the user device associated with the user.

10. The computer program product of claim 7, wherein the machine learning model is a logistic regression model configured to categorize the one or more network navigation inputs into a first group or a second group, wherein the first group indicates that the user needs assistance.

11. The computer program product of claim 7, wherein the one or more previous network navigation indicators are generated via a network page graph of at least two page nodes and at least one navigation edges, wherein the at least two page nodes comprise a page node corresponding to each of the two or more pages of the network, and wherein each of the at least one navigation edges correspond to a link between the two or more pages.

12. The computer program product of claim 11, wherein the computer program product further comprises an executable portion configured to train a machine learning model based on the network page graph.

13. A computer-implemented method for providing electronic navigation assistance based on data patterns via process tracking graphing, the method comprising:

receiving one or more network navigation inputs completed by a user device associated with a user, wherein the one or more network navigation inputs are indications of executed navigation between two or more pages on a network;

comparing, using a machine learning model, the one or more network navigation inputs with one or more previous network navigation indicators, wherein the machine learning model is trained using the one or more previous network navigation indicators that include one or more network navigation inputs from at least one previous navigation of the two or more pages on the network and a destination page for each of the at least one previous navigation, wherein the one or more network navigation inputs from at least one previous navigation of the two or more pages on the network comprises at least one of an average number of times a link is traversed during the at least one previous navigation, amount of detour associated with the at least one previous navigation, amount of backtracking associated with at least one previous navigation, and clickstream compactness indicating traversal distance associated with the at least one previous navigation;

determining a user location status based on the comparison of the one or more network navigation inputs with the one or more previous network navigation indicators, wherein the user location status indicates a node of a plurality of nodes on the network, wherein the user location status indicates whether the user needs assistance;

causing a transmission of an assistance notification to the user device associated with the user based on determining that the user needs assistance and;

wherein the one or more network navigation inputs from at least one previous navigation of the two or more pages on the network further comprises an average out degree of nodes in a path associated with the at least one previous navigation, an average distance from a root node to every other node associated with the at least one previous navigation, connection ratios associated with the at least one previous navigation, and shortest path from the root node to a target node associated with the at least one previous navigation.

14. The method of claim 13, wherein the assistance notification comprises at least one recommended destination for the user device associated with the user based on the one or more network navigation inputs.

15. The method of claim 13, wherein the assistance notification comprises a destination request from the user device associated with the user and upon receiving a destination request response to the destination request from the user device associated with the user, the method further comprises providing access to a destination indicated in the destination request response.

16. The method of claim 13, wherein the machine learning model is a logistic regression model configured to categorize the one or more network navigation inputs into a first group or a second group, wherein the first group indicates that the user needs assistance.

17. The method of claim 13, wherein the one or more previous network navigation indicators are generated via a network page graph of at least two page nodes and at least one navigation edges, wherein the at least two page nodes comprise a page node corresponding to each of the two or more pages of the network, and wherein each of the at least one navigation edges correspond to a link between the two or more pages.

* * * * *